United States Patent
Caputo

(10) Patent No.: US 10,280,571 B2
(45) Date of Patent: *May 7, 2019

(54) ASSEMBLY AND METHOD FOR MANUFACTURING A PISTON ROD AND A TAMPER BAR

(71) Applicant: BOMAG GMBH, Boppard (DE)

(72) Inventor: Gianluca Caputo, Castenaso (IT)

(73) Assignee: BOMAG GMBH, Boppoard (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,207

(22) Filed: Jun. 4, 2018

(65) Prior Publication Data

US 2018/0282951 A1    Oct. 4, 2018

Related U.S. Application Data

(62) Division of application No. 15/355,662, filed on Nov. 18, 2016, now Pat. No. 9,988,771.

(30) Foreign Application Priority Data

Nov. 18, 2015 (EP) .................... 15003292

(51) Int. Cl.
*E01C 23/14* (2006.01)
*E01C 19/40* (2006.01)
(Continued)

(52) U.S. Cl.
CPC .............. *E01C 19/405* (2013.01); *C23C 4/06* (2013.01); *C23C 4/10* (2013.01); *C23C 4/126* (2016.01);
(Continued)

(58) Field of Classification Search
CPC ............................ E01C 23/14; E01C 2301/10

USPC ........................................... 404/95
See application file for complete search history.

(56) References Cited

U.S. PATENT DOCUMENTS 5,889,261 A * 3/1999 Boardman ................ C23C 4/02
219/543
6,124,580 A    9/2000 Nottmeier et al.
(Continued)

FOREIGN PATENT DOCUMENTS

DE    9313161    10/1993
EP    2599919    6/2013

OTHER PUBLICATIONS

Office Action from related U.S. Appl. No. 15/355,775 dated Aug. 8, 2017.
(Continued)

*Primary Examiner* — Gary S Hartmann
(74) *Attorney, Agent, or Firm* — Grossman, Tucker, Perreault & Pfleger, PLLC

(57) ABSTRACT

A road finisher includes a screed plate extending at right angles to the working direction of the road finisher, a tamper bar disposed rearwardly and/or forwardly of the screed plate in the working direction, wherein at least one electrically operated heating element is configured to heat up a heating surface facing a road subsurface, the heating element comprising a heating layer at least partially obtained through thermal spraying onto a substrate surface, and a piston rod with connecting means to a tamper bar drive. The tamper bar is connected to the piston rod with an upper surface of the tamper bar contacting a lower surface of the piston rod, wherein the piston rod is single-pieced with regard to its connecting means and its lower surface, and the heating layer is located between the piston rod and the tamper bar, especially applied to the lower surface of the piston rod.

20 Claims, 4 Drawing Sheets

(51) Int. Cl.
*C23C 4/126* (2016.01)
*C23C 4/134* (2016.01)
*C23C 4/06* (2016.01)
*C23C 4/10* (2016.01)
*E01C 19/30* (2006.01)
*F16M 13/02* (2006.01)
*E01C 19/48* (2006.01)

(52) U.S. Cl.
CPC .............. *C23C 4/134* (2016.01); *E01C 19/30* (2013.01); *E01C 19/4833* (2013.01); *F16M 13/02* (2013.01); *E01C 19/40* (2013.01); *E01C 19/486* (2013.01); *E01C 2301/10* (2013.01)

(56) References Cited

U.S. PATENT DOCUMENTS

| | | | |
|---|---|---|---|
| 6,318,928 B1* | 11/2001 | Swearingen | E01C 19/42 404/72 |
| 7,427,174 B2* | 9/2008 | Dearing | E01C 19/407 404/118 |
| 8,113,738 B2 | 2/2012 | Mahler et al. | |
| 9,249,544 B2 | 2/2016 | Caputo | |
| 9,988,771 B2* | 6/2018 | Caputo | C23C 4/126 |
| 10,113,274 B2* | 10/2018 | Caputo | C23C 4/126 |
| 2010/0108661 A1* | 5/2010 | Vontell | H05B 3/34 219/477 |
| 2011/0120987 A1* | 5/2011 | Abbott | C23C 4/06 219/553 |
| 2013/0042465 A1* | 2/2013 | Esser | C23C 24/08 29/611 |
| 2017/0138002 A1 | 5/2017 | Caputo | |

OTHER PUBLICATIONS

Ex parte Quayle Office Action from related U.S. Appl. No. 15/355,775 dated Feb. 26, 2018.

* cited by examiner

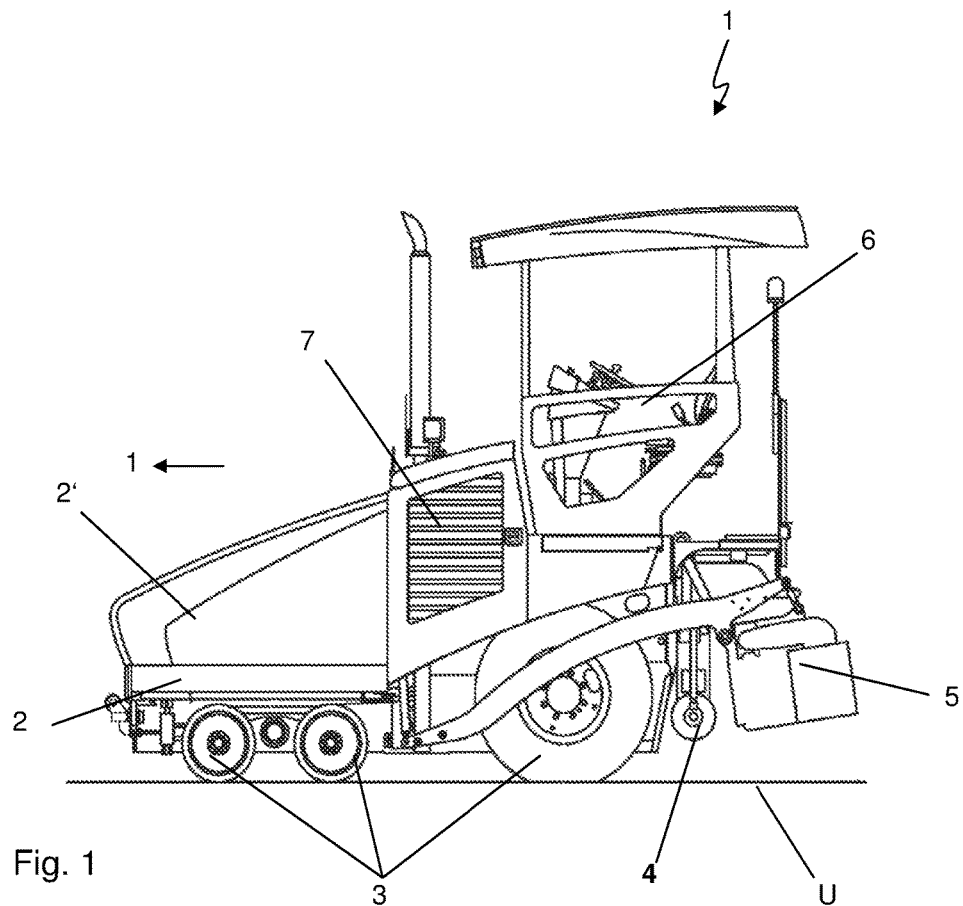
Fig. 1
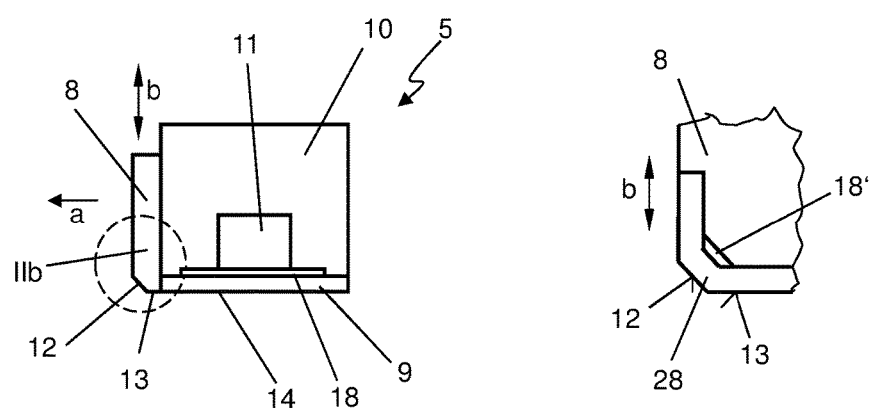
Fig. 2a
(Prior Art)
Fig. 2b
(Prior Art)

ASSEMBLY AND METHOD FOR MANUFACTURING A PISTON ROD AND A TAMPER BAR

CROSS REFERENCE TO RELATED APPLICATIONS

The present application is a divisional application of U.S. non-provisional patent application Ser. No. 15/355,662, filed Nov. 18, 2016, now pending, which claims priority to European patent application serial no. 15003292.8, filed on Nov. 18, 2015, both of which are incorporated by reference herein.

FIELD

The present application generally relates to a road finisher comprising a screed plate and a tamper bar, the tamper bar being heated by a heating element, and more particularly, relates to a piston rod for a road finisher and a method of manufacturing an assembly of a piston rod and a tamper bar.

BACKGROUND

Road finishers or asphalt finishers are construction machines for producing asphalt surfaces, also known as pavers. In operation, the road finisher distributes and smoothes bituminous paving material, and may also compact the same. For this, the road finisher basically is equipped with a screed plate for smoothing the paving material, and a tamper bar for precompacting the paving material before it is smoothed. In order to prevent sticking of the bituminous paving material to the paving device, heating devices are employed which heat up the tamper bar and/or the screed plate and which may be implemented on the tamper bar and/or the screed plate, for example, as a multi-layered structure of heating layers applied by thermal spraying.

US 2015/0037097 A1 discloses a road finisher comprising a screed plate and/or tamper bar wherein a heating layer is applied to the screed plate and/or tamper bar by thermal spraying.

However, the solutions known from prior art for heating the tamper bar on the one hand are rather expensive, and on the other hand, require a rather complex production procedure. Since the tamper bar with its tamping surface is subject to high stress, it usually has to be replaced after a certain operating period and thus, together with it, the entire heating device connected thereto has to be replaced too, thus increasing the maintenance costs of the road finisher.

Also, it is only possible to arrange the heating device or to apply the heating layers into a corresponding recess on the backside of the tamper bar opposite to the tamping surface in order to avoid damage or even destruction of the heating device during operation, when the tamping surface hits the ground with high pressure. Thus, the positioning possibilities of the heating device are restricted, since it requires a protected area, whereby possibly even additional protection means may have to be provided. The restricted freedom of positioning may cause, for example, an adverse non-uniform heating-distribution or the generation of hot points next to the contact surfaces as well as rather long heating-up times until the tamper bar has reached the desired operating temperature. Finally, with the known arrangements of heating devices at tamper bars of a road finisher, also high material costs are created, since the entire tamper bar has to consist of a heat-treated material.

SUMMARY

Therefore, it is an object of the present invention to provide a more cost efficient solution of a heated tamper bar for a road finisher. This object is solved by a road finisher having the features according to claim 1, a piston rod for a road finisher having the features according to claim 9, and a method of manufacturing a tamper bar having the features according to claim 10. Further embodiments of the invention are defined in the respective dependent claims.

According to the invention, a road finisher is provided, comprising a screed plate extending at right angles to the working direction of said road finisher, a tamper bar disposed rearwardly and/or forwardly of said screed plate in the working direction (a), wherein at least one electrically operated heating element is present, which is configured so as to heat up a heating surface facing a road subsurface (U), and wherein said heating element comprises a heating layer at least partially obtained through thermal spraying onto a substrate surface, and a piston rod with connecting means to a tamper bar drive, wherein the tamper bar is connected to the piston rod with an upper surface of the tamper bar contacting a lower surface of the piston rod, wherein the piston rod is single-pieced with regard to its connecting means and its lower surface, and in that the heating layer is located between the piston rod and the tamper bar, especially applied to the lower surface of the piston rod.

Thus, due to the inventive configuration according to which the heating element or the heating layer is located between the piston rod and the tamper bar, especially applied to the lower surface of the piston rod, the heating element is being sandwiched inbetween the piston rod and the tamper bar and is thus protected when the piston rod and the tamper bar are in an assembled state without having to employ any additional protection means. This configuration facilitates the production procedure and therefore, reduces production costs. Moreover, if, after a certain operation time, wear renders the tamper bar unusable, it may be replaced without at the same time having to replace the heating element which remains unaffected on the piston rod during replacement of the tamper bar, thereby saving maintenance costs. Furthermore, especially when the heating layer is applied to the piston rod, the tamper bar can be manufactured in a more cost efficient manner since less material, for example hardened steel, is required.

Moreover, it is noted that by using thermal spraying which is defined as a standard in DIN EN 657, the surface to be coated can be coated directly without the need to provide a specifically processed cavity or hole for the heating element which has to be produced by expensive and complex procedures or to apply the heating element by adhesive bonding. Moreover, a heating layer obtained by thermal spraying provides the advantage of being extremely resistant against mechanical stress and allows for optimized heat transfer to the tamper bar. As a result of the implementation of such a heating element having a heating layer obtained by thermal spraying, the initial heating phase can be reduced considerably, which in turn results in reduced fuel consumption and an increased efficiency of the road finisher. Additionally, a heating layer applied by thermal spraying can be easily applied to any structured surface, even to angled structures.

It is noted that the term "heating layer" functionally refers to a coating by means of which a heating effect can be achieved. To this end, the heating layer is connected by suitable connecting means to the power source and can be switched on and off by means of a switch gear unit. The term "heating element" refers to the entire unit consisting of the heating layer and its connections to the power source.

According to a preferred embodiment, the lower surface of the piston rod which contacts the upper surface of the tamper bar is a lower surface formed on a base member of the piston rod, the base member extending, at least almost, over the entire length of the upper surface of the tamper bar. Thereby, a very uniform and homogenous heat transfer from the heating element to the tamper bar, and thus, a homogenous heat distribution within the tamper bar can be achieved. With a uniform and homogenous heat distribution within the tamper bar, bituminous material to be compacted and smoothed can be efficiently prevented from sticking to the working surface of the tamper bar. Furthermore, the heat-up time can be reduced significantly.

Further, the heating layer, which preferably is multilayered, may comprise at least an insulating layer, a strip conductor and a sealing layer. This heating layer is preferably accommodated in the groove, especially without protruding over the surface surrounding the groove. The groove is advantageously formed on the lower surface facing the tamper bar. The strip conductor is the layer that is connected to the power source and that heats up when electric current is applied thereto. The sealing layer, by contrast, performs a protective function for the strip conductor and shields the same from the environment on that side of the heating element being opposite to and facing away from the respective tamper bar member. The insulation layer electrically insulates the strip conductor, through which an electric current flows during the heating operation from the tamper bar. To this end, the insulating layer is located between the respective tamper bar member and the strip conductor. Further, the groove after assembling the tamper bar and the piston rod, provides an enclosed and thus protected area for the heating element. The thus provided cavity offers optimal protection for the heating element so as to ensure a long lifetime of the latter. It is furthermore possible that the heating layer additionally comprises a further anchor layer between the insulating layer and the tamper bar element.

Further, the heating layer may be applied to a surface of the groove that is preferably located in the lower surface of the piston rod but may alternatively be located in the upper surface of the tamper bar at least partially and preferably completely by plasma spraying or high velocity oxygen fuel spraying (HVOF). Both plasma spraying and HVOF are examples for a preferred thermal spraying method. These thermal spraying techniques are coating processes in which molten (or heated) materials are sprayed onto a surface. The "feedstock" (coating precursor) is heated by electrical (plasma or arc) or chemical means (combustion flame). A spray torch (or spray gun) is the device performing the melting and acceleration of the particles to be deposited. Plasma spraying, as a subgroup of the thermal spraying methods, is characterized by causing melting to be effected by the high plasma temperature or a gas or gas mixture passing through the plasma torch, which gas or gas mixture has been guided through an arc and ionized. When hitting the surface to be coated, the particles flatten and harden, thus forming a very stable layer of a desired thickness on the surface to be coated.

The groove, in the assembled state of the piston rod and the tamper bar member, may provide an encapsulated cavity for the heating layer. The thus provided cavity offers optimal protection for the heating element so as to ensure a long lifetime of the latter.

According to another preferred embodiment, the tamper bar is made from hardened steel so as to ensure that it may withstand wear and has a long lifetime.

Moreover, at least said insulating layer and/or said sealing layer may be made from an alumina based material, preferably, from alumina with a purity of at least 99.7%.

The strip conductor may consist substantially of nickel, chromium, or an alloy including both nickel and chromium.

According to still a further embodiment of the invention, electrical connections of the heating element are provided on an upper surface of the base member of the piston rod, preferably, in a casing where they are protected from external influences.

It is also advantageous, if the tamper bar is connected to the piston rod by fixation means, preferably, by screws or bolts. The use of screws and bolts enables an easy and fast assembling of the tamper bar and the piston rod, e.g., when the tamper bar has to be replaced.

Further, according to the invention, a piston rod for a road finisher according to the above listed embodiments is provided according to the present invention. The piston rod which comprises the heating element or heating layer offers the advantages already described above.

Also, according to the invention, a method of manufacturing an assembly of a piston rod as described above and a tamper bar is provided, comprising the following steps of forming a piston rod having a base member with a lower surface; forming a tamper bar having an upper surface which, when connected to the piston rod, contacts the lower surface of the base member of the piston rod; forming a groove in the upper surface of the tamper bar or, preferably, in the lower surface of the base member of the piston rod, applying a heating layer of a heating element to a surface of the groove; and connecting the piston rod to the tamper bar.

The method for manufacturing a tamper bar is very economical, since the heating member, after the assembly of the tamper bar member and the piston rod, does not require any additional production steps for protecting it by additional protection means or the like. Also, the use of thermal spraying for the application of the heating element offers several advantages which already have been described above.

In the method of manufacturing an assembly of a piston rod and a tamper bar, the heating layer may be multilayered comprising at least an insulating layer, a strip conductor and a sealing layer, wherein the step of applying the heating layer is performed by plasma spraying or HVOF.

Further, the step of connecting the tamper bar member to the piston rod may be carried out by screwing screws through the base member of the piston rod and at least partially through the tamper bar.

Preferably, the method further comprises a step of providing electrical connections in the base member of the piston rod for electrically connecting the heating element to a power source.

The present invention is described in greater detail below with reference to the exemplary embodiments shown in the figures.

BRIEF DESCRIPTION OF THE DRAWINGS

FIG. 1 is a side view of a road finisher;

FIG. 2a is a side view of a paving screed comprising a tamper bar and a screed plate according to prior art;

FIG. 2b is an enlarged detail of the tamper bar according to prior art of FIG. 2a;

FIG. 5a is a vertical cross-sectional view of a metallic support plate of the piston rod;

FIG. 5b is a horizontal cross-sectional view of the piston rod shown in FIG. 5a;

FIG. 5c is an alternative embodiment relating to FIG. 5b;

FIG. 5d is a further alternative embodiment relating to FIG. 5b; and

DETAILED DESCRIPTION

Figure 3:
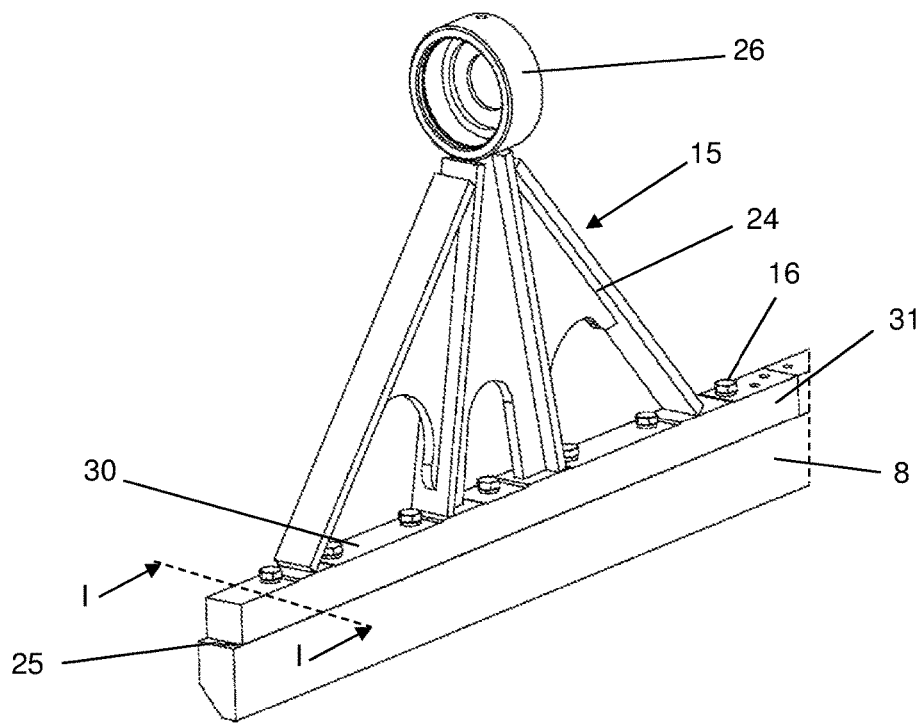
FIG. 3 is a perspective view of a piston rod and a tamper bar according to an embodiment of the invention.

As shown in FIG. 1, the essential components of the road finisher 1 are a machine frame 2, driving devices 3 for the traveling operation (track systems can also be used in this context, in part), a bunker 2' for accommodating paving material, a transporting unit (not shown in detail), by means of which the paving material accommodated in the bunker is transported rearwardly contrary to the working direction "a" to the paving section, a spreading screw 4, by means of which the paving material is distributed across the paving width of the road finisher 1 at right angles to the working direction "a", and a paving screed 5 that is trailed after the road finisher 1 during the paving operation in a floating manner on the bituminous paving material. The paving screed is mounted on the road finisher 1 so as to be vertically displaceable and can be lowered from its raised starting position towards the road subsurface for execution of the operating mode. Furthermore, a control platform 6 and a drive motor 7 are provided. In the operating mode, the road finisher 1 moves in the working direction "a" and deposits a layer of bituminous paving material of a desired thickness on the road subsurface for execution of the operating mode. Furthermore, a control platform 6 and a drive motor 7 are provided. In the operating mode, the road finisher 1 moves in the working direction "a" and deposits a layer of bituminous paving material of a desired thickness on the road subsurface "U".

FIG. 2a illustrates the essential components of the paving screed. These include a tamper bar 8, a smoothing plate 9 disposed rearwardly of the same in the working direction "a", and a carrier housing 10 comprising an exciter unit 11. The carrier housing 10 and the smoothing plate 9 together form the screed plate. The tamper bar 8 is capable of being moved vertically in the direction of the arrow "b" and thus of carrying out stamping movements in the direction of the arrow "b" during the paving operation. In its front region, the tamper bar 8 comprises an obliquely extending guiding surface (lead-in slope 12) in the working direction followed by a horizontally extending tamping surface 13. The tamper bar 8 is followed by the smoothing plate 9. Above the smoothing plate 9 there is disposed the exciter unit 11 by means of which an oscillating movement can be induced in the paving screed 5. This basic structure of the paving screed 5 is known in the art. Further, the smoothing plate 9 comprises an underside 14 that slides over the paving material and levels the same during the operating mode. The smoothing plate 9 and the part having the lead-in slope 12 are each configured to have a first and a second heating layer 18, 18', respectively, as part of a heating element.

FIG. 2b illustrates the enlarged detail IIb of the tamper bar 8 as shown in FIG. 2a according to prior art. The tamper bar 8 has an L-steel rail 28 comprising a vertical and a horizontal leg and a part with the lead-in slope 12 connecting the two legs. The steel rail or metallic support plate 28 is covering the front edge of the tamper bar 8. On the back side of the part having lead-in slope 12 there is provided the second heating layer 18'. It is also possible to have a heating layer (not shown) on the back side of the horizontal and/or vertical leg of the tamper bar 8. The term "back side" in each case designates the outside surface facing away from the paving material. Thus, according to this configuration known from prior art, arrangement of the heating element is restricted to the back side of the tamper bar 8.

FIG. 3 is a perspective view of a piston rod 15 and a tamper bar 8 according to an embodiment of the invention. Here, only the left hand side of the entire tamper bar 8 is shown, whereby it is noted that on the right hand side, an identical further piston rod 15 is provided.

The piston rod 15, at its upper end, has connecting means 26 for connecting the tamper bar 8 to a part of a drive means not shown here. In particular, an exciter shaft may be supported in the connecting means 26 of the piston rods 15. Further, the piston rod 15 has an intermediate member 24 and a base member 31, the intermediate member 24, such as a suitable rodding, connecting the connecting means 26 to the base member 31. The base member 31, the intermediate member 24, and the connecting means 26 are formed integrally as one piece. This includes manufacturing the piston rod 15 as a solid single-pieced element as well as manufacturing the piston rod 15 as a single-pieced element obtained by irreversibly connecting several elements, for example via welding. The base member 31 has a lower surface 23 (see FIG. 4) which contacts an upper surface 25 of the tamper bar 8 by means of a plurality of screws 16.

In between the tamper bar 8 and the piston rod 15, there is arranged a heating element 17 (see FIG. 4) comprising a multi-layered structure of layers (see FIGS. 5a to 5d) which is applied to the lower surface 23 of the base member 31 of the piston rod 15 by thermal spraying. Thus, upon replacement of the tamper bar 8, the heating element 17 does not have to be replaced together with it but rather remains unaffected by the replacement procedure of the tamper bar 8 on the lower surface 23 of the base member 31.

On the upper surface 30 of the base member 31, a casing or cap not shown here may be provided to accommodate and protect the electrical connections of the heating element 17.

Figure 4:
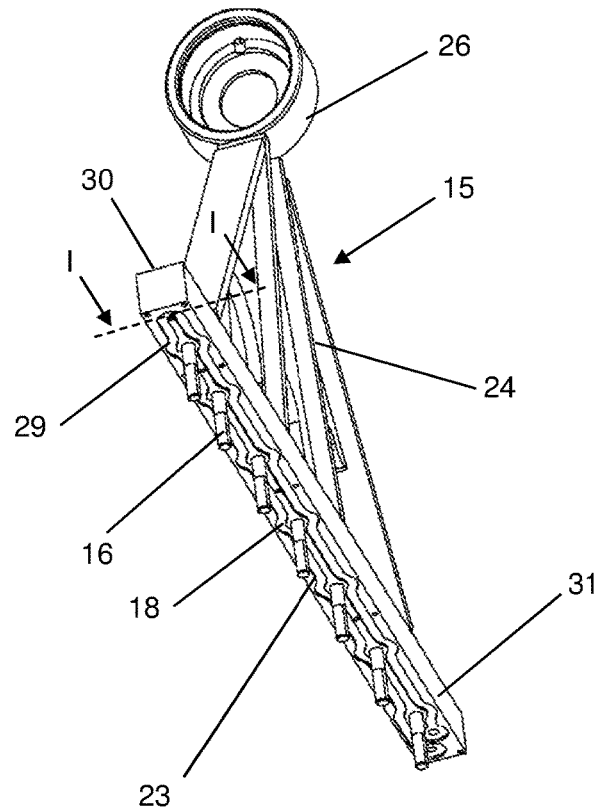
FIG. 4 is a perspective view of a the piston rod shown in FIG. 3.

FIG. 4 is a perspective view of the piston rod 15 shown in FIG. 3 from below, here disassembled from the tamper bar 8 which is not shown here. As can be seen, the lower surface 23 of the base member 31 is provided with a groove 29 in which the heating layers 18 of the heating element 17 are applied by thermal spraying. Further, screws 16 can be seen running through the base member 31 and projecting from its lower surface 23. In an assembled state, the screws 16 are in engagement with corresponding holes (not shown) provided in the upper surface 25 of the tamper bar 8 at corresponding positions.

Figure 5:
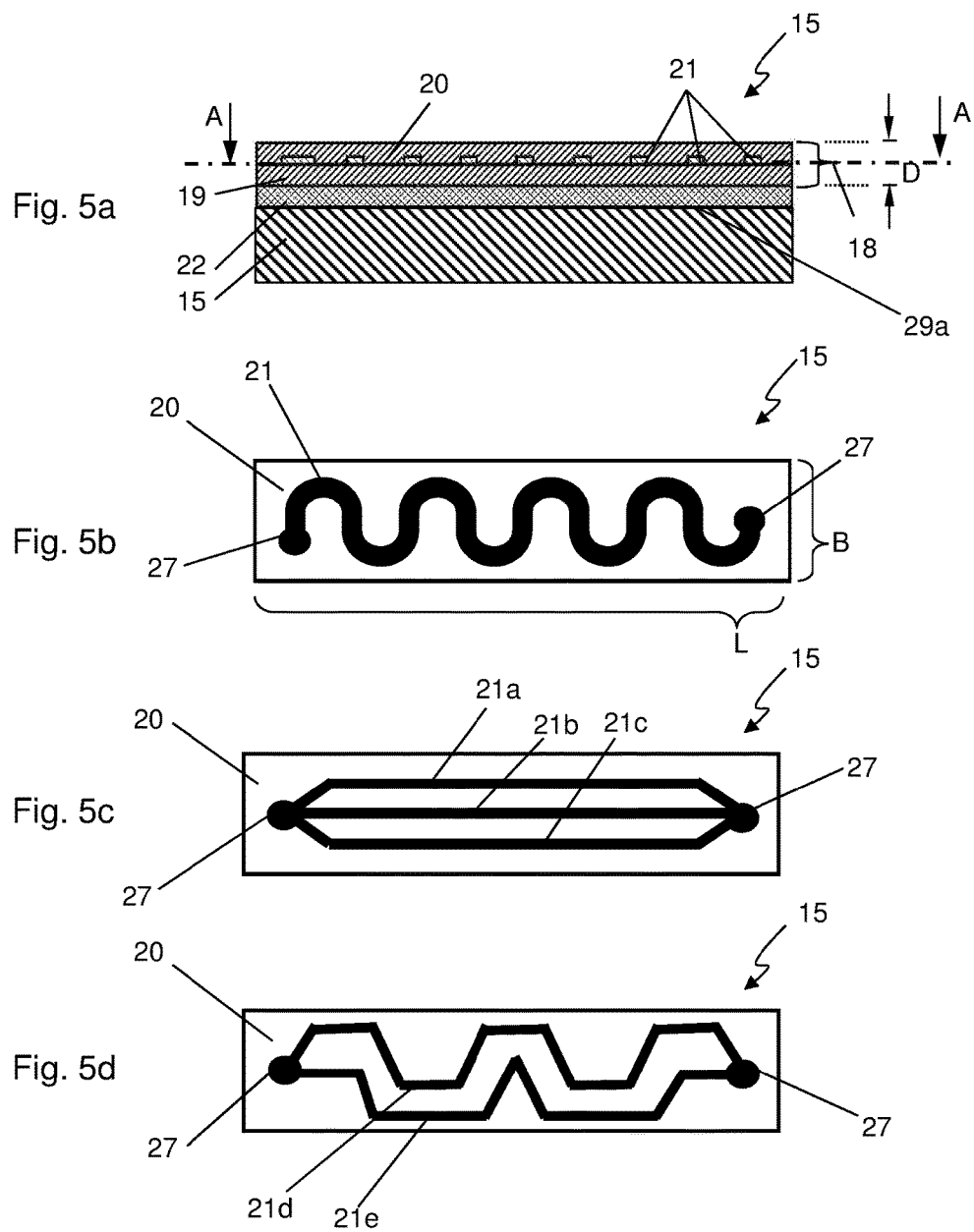

As shown in FIG. 5a, the first heating layer 18 of the heating element 17 applied to the groove 29 of the lower surface 23 of the base member 31 of the piston rod 15 and is composed of a total of three layers including an electrically insulating layer 19, a sealing layer 20, and a metallic strip conductor 21. Each of these layers has been applied successively and on top of each other by thermal spraying. An intermediate anchor layer 22 is, likewise by thermal spraying, applied directly to the lower surface bottom 29a of the groove 29 of the base member 31 of the piston rod 15. The metallic strip conductor 21 is applied to the surface of the insulating layer 19 facing the sealing layer 20 and is covered by the sealing layer 20. The metallic strip conductor 21 serves as an electrical heating member to heat the sealing layer 20 and forms part of an electric heating circuit which is connected to an electrical power supply system (not shown).

The heating layer 18 can be obtained by successively applying the three layers 19, 20 and 21 by means of thermal spraying, in particular, by means of a thermal plasma spraying technique or HVOF, onto the piston rod 15 (or to a metallic support plate support plate 28'). Any remarks made hereinafter with reference to thermal plasma spraying is to be understood to likewise apply, within the scope of the present invention, to other thermal spraying techniques such as, in particular, HVOF. Thermal plasma spraying technique is a surface coating technology known in the industry. For this purpose in a first step, the intermediate anchor layer 22 is sprayed onto the surface of the support plate 28' following preparation of the surface by sand blasting. In particular, a defined surface roughness enables particularly stable, essentially mechanical anchoring of the optional intermediate anchor layer 22 on the bottom 29a of the groove 29 of the piston rod 15. Then, the insulating layer 19 is deposited onto the intermediate anchor layer 22 by thermal plasma spraying technique. Next, the strip conductor 21 is deposited on the insulating layer 19 also by thermal plasma spraying technique. Finally, the sealing layer 20 is deposited to seal the insulating layer 19 and the strip conductor 21 from the environment and, in particular, to provide mechanical protection towards the environment. In this specific exemplary embodiment, the strip conductor 21 is deposited on the insulating layer 19 and embedded in the sealing layer 20. Thus, at least three successive steps of the plasma spraying procedure are performed to obtain the heating layer 18. The sealing layer 20 and the insulating layer 19 are each composed of alumina based material, whereas the strip conductor 21 is preferably composed, for example, of a nickel-chromium alloy, or of another material composition, in particular, as described above. The heating layer 18 has a thickness "D". The single layers including the insulating layer 19 and the sealing layer 20 are substantially of the same size and of the same thickness, and strip conductor 21 can be of a substantially smaller thickness than, for example, the sealing layer 20.

FIG. 5b is a horizontal cross sectional view of the piston rod 15 along the line A-A in FIG. 5a. FIG. 5b illustrates that the strip conductor 21 extends in a meandrous pattern across the surface of the insulating layer 19. When implemented in practice, the strip conductor 21 is not visible on the piston rod 15, as it is covered towards the top by the sealing layer 20. Thus, FIG. 5b shows the course of the strip conductor 21 as being underneath the sealing layer 20 merely for the purpose of clarification.

The strip conductor 21 terminates at both ends at contact points 27 that are connected to an electrical power supply system (not shown). To this end, provision is made, in particular, for contact pins or comparable connecting means, for example, to lead away from the piston rod 15.

FIGS. 5c and 5d show further exemplary embodiments of a possible run of the strip conductor. In FIG. 5c, the strip conductor is arranged in a linear pattern of webs across the bottom 29a of the groove 29 of the piston rod 15 with a number of individual webs 21a, 21b, 21c running parallel to each other. By contrast, FIG. 5d shows two webs 21d, 21e of the strip conductor that are interconnected with each other. It is essential for the configuration of the strip conductor that the underside of the connected tamper bar 8 facing the paving material, apart from heating up rapidly, should also heat up at the same time over its entire surface as far as possible in order to prevent any bituminous paving material from sticking thereto.

Figure 6:
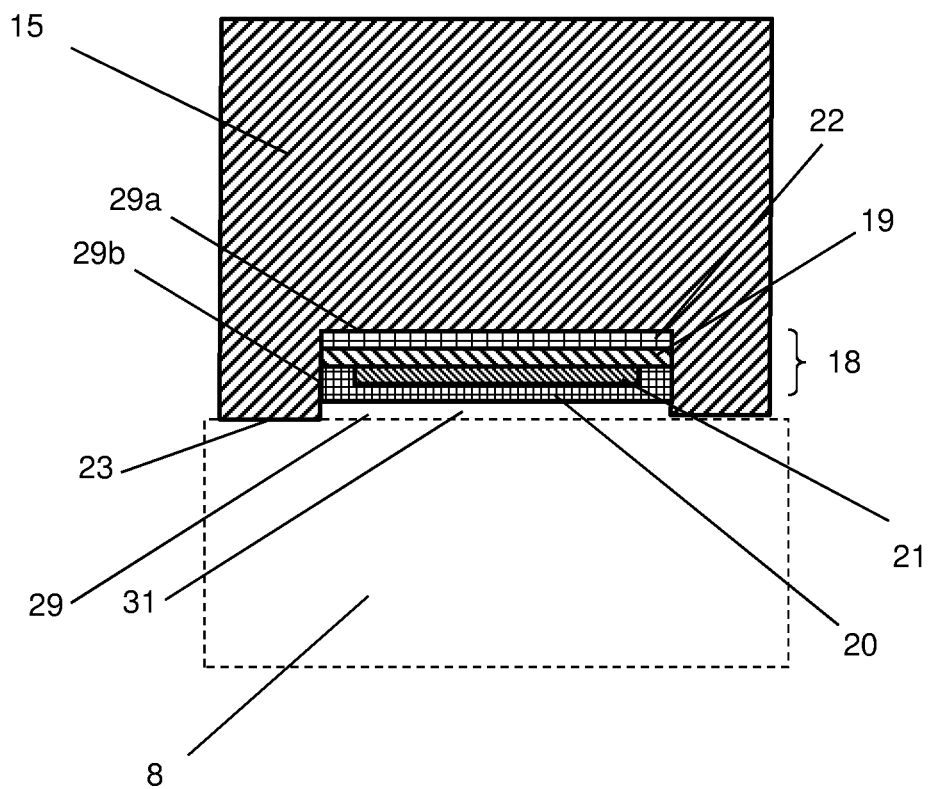
FIG. 6 is a vertical cross-sectional view of the piston rod with the heating layer being positioned in a groove.

FIG. 6 further clarifies the positioning of the heating layer 18 in the groove 29, in the shown example in the piston rod 15. FIG. 6 is a partial cross-sectional view along line I-I of FIGS. 3 and 4. The groove 29 comprises a groove bottom 29a and groove side walls 29b, wherein the groove side walls 29b extend between the groove bottom 29a and the lower surface 23 of the piston rod 15. As can clearly be seen, the heating layer 18 is accommodated with all of its layers within the groove 29. Thus, the heating layer 18 does not protrude over the surrounding surface of the lower surface 23 of the piston rod 15. In the shown example, there is furthermore provided a gap 31 between the outer surface of the heating layer 18 and the upper surface of the tamper bar 8'. Thus, in the assembled state of the tamper bar 8 and the piston rod 15, the heating layer is not directly contacting the tamper bar. It is however possible and part of the invention as well, to fill up the groove 29 up to that the heating layer is essentially flush with the lower surface 23 of the piston rod 15 (per definition, the surface of the groove is not part of the lower or upper surface of the tamper 8 or the piston rod 15, respectively). For example the material of the outer sealing layer 20 may be used for this purpose.

The invention claimed is:

1. A piston rod for a road finisher, the piston rod comprising:
a connecting portion to connect the piston rod to a tamper bar drive,
wherein the piston rod is configured to be connected to a tamper bar with a lower surface of the piston rod contacting an upper surface of the tamper bar, and
wherein a heating layer of a heating element is disposed at the lower surface of the piston rod, wherein the heating layer at least partially comprises a thermal spray coating.

2. The piston rod according to claim 1, wherein:
the heating layer comprises an insulating layer; and
the insulating layer comprises the thermal spray coating.

3. The piston rod according to claim 1, wherein:
the heating layer comprises a strip conductor; and
the strip conductor comprises the thermal spray coating.

4. The piston rod according to claim 1, wherein:
the heating layer comprises a sealing layer; and
the sealing layer comprises the thermal spray coating.

5. The piston rod according to claim 1, wherein:
the heating layer at least partially comprises a multilayered thermal spray coating; and
the multilayered thermal spray coating comprises at least an insulating layer, a strip conductor, and a sealing layer.

6. The piston rod according to claim 1, wherein:
the heating layer is disposed in a groove in the lower surface of the piston rod.

7. A method of manufacturing an assembly of a piston rod and a tamper bar, comprising the following steps:
forming a piston rod having a base member with a lower surface;
forming a tamper bar having an upper surface which, when connected to the piston rod, contacts the lower surface of the base member of the piston rod;
forming a groove in the lower surface of the base member of the piston rod or in the upper surface of the tamper bar;

disposing a heating layer of a heating element in the groove, wherein the heating layer at least partially comprises a thermal spray coating; and connecting the piston rod to the tamper bar.

8. The method according to claim 7, wherein:

the thermal spray coating comprises at least one of a plasma spray coating and a high velocity oxygen fuel spray coating.

9. The method according to claim 7, wherein:

connecting the piston rod to the tamper bar further comprises screwing screws through the base member of the piston rod and at least partially through the tamper bar.

10. The method according to claim 7, further comprising:

providing electrical connections for electrically connecting the heating element to a power source.

11. The method according to claim 7, wherein:

the heating layer comprises an insulating layer; and
the insulating layer comprises the thermal spray coating.

12. The method according to claim 7, wherein:

the heating layer comprises a strip conductor; and
the strip conductor comprises the thermal spray coating.

13. The method according to claim 7, wherein:

the heating layer comprises a sealing layer; and
the sealing layer comprises the thermal spray coating.

14. The method according to claim 7, wherein:

the heating layer at least partially comprises a multilayered thermal spray coating; and
the multilayered thermal spray coating comprises at least an insulating layer, a strip conductor, and a sealing layer.

15. The method according to claim 7, wherein:

disposing the heating layer of the heating element in the groove further comprises applying the heating layer of the heating element to a surface of the groove.

16. The method according to claim 15, wherein:

applying the heating layer of the heating element to the surface of the groove comprises thermal spraying of the heating layer.

17. The method according to claim 16, wherein:

thermal spraying comprises at least one of plasma spraying and high velocity oxygen fuel spraying.

18. The method according to claim 16, wherein:

the heating layer comprises an insulating layer; and
thermal spraying of the heating layer comprises thermal spraying of the insulating layer.

19. The method according to claim 16, wherein:

the heating layer comprises a strip conductor; and
thermal spraying of the heating layer comprises thermal spraying of the strip conductor.

20. The method according to claim 16, wherein:

the heating layer comprises a sealing layer; and
thermal spraying of the heating layer comprises thermal spraying of the sealing layer.

* * * * *